United States Patent
Will

(10) Patent No.: US 12,515,935 B2
(45) Date of Patent: Jan. 6, 2026

(54) METHOD FOR PRODUCT GUIDANCE IN A FILLING SYSTEM AND FILLING SYSTEM FOR GLASS BOTTLES

(71) Applicant: KRONES AG, Neutraubling (GE)

(72) Inventor: Christof Will, Neutraubling (DE)

(73) Assignee: KRONES AG, Neutraubling (DE)

( * ) Notice: Subject to any disclaimer, the term of this patent is extended or adjusted under 35 U.S.C. 154(b) by 1116 days.

(21) Appl. No.: 17/593,031

(22) PCT Filed: Feb. 10, 2020

(86) PCT No.: PCT/EP2020/053301
§ 371 (c)(1),
(2) Date: Sep. 3, 2021

(87) PCT Pub. No.: WO2020/177983
PCT Pub. Date: Sep. 10, 2020

(65) Prior Publication Data
US 2022/0135387 A1 May 5, 2022

(30) Foreign Application Priority Data
Mar. 6, 2019 (DE) .................. 10 2019 203 060.2

(51) Int. Cl.
*B67C 3/00* (2006.01)
*B67C 3/22* (2006.01)
(Continued)

(52) U.S. Cl.
CPC .............. *B67C 3/007* (2013.01); *B67C 3/22* (2013.01); *B67C 7/00* (2013.01); *G06T 7/0004* (2013.01)

(58) Field of Classification Search
CPC .. B67C 3/007; B67C 3/22; B67C 7/00; G06T 7/0004; G05B 2219/32212; G05B 2219/45009; G05B 19/41875; Y02P 90/02
See application file for complete search history.

(56) References Cited

U.S. PATENT DOCUMENTS 11,534,955 B2* 12/2022 Blochmann ......... B29C 49/4273
11,807,510 B2* 11/2023 Winter .................... B67C 3/023
(Continued)

FOREIGN PATENT DOCUMENTS

CN 101988906 A 3/2011
CN 102335664 A 2/2012
(Continued)

OTHER PUBLICATIONS

ISA European Patent Office, International Search Report Issued in Application No. PCT/EP2020/053301, Apr. 29, 2020, WIPO, 4 pages.

*Primary Examiner* — Michael Collins
(74) *Attorney, Agent, or Firm* — McCoy Russell LLP

(57) ABSTRACT

A method for product guidance in a filling system for glass bottles, and a corresponding production system are described. Empties parameters for filling the empty glass bottles are measured in an automated manner. Initial data for filling a liquid product into the bottles is acquired and stored. Fulls parameters are measured when the bottles are filled, where machine error states are also detected, and respective results data acquired relating to the filling process are savored and individually associated with the empty bottles. At least one lead-out criterion applicable in the downstream production operation is calculated for deciding whether or not to lead-out faulty empty bottles or filled bottles based on the initial data and results data stored. The lead-out criterion is additionally updated in an automated manner while taking into consideration the acquired initial data and results data.

19 Claims, 1 Drawing Sheet

(51) Int. Cl.
  *B67C 7/00*    (2006.01)
  *G06T 7/00*    (2017.01)

(56) References Cited

U.S. PATENT DOCUMENTS

| | | |
|---|---|---|
| 2006/0149407 A1 | 7/2006 | Markham et al. |
| 2009/0145511 A1* | 6/2009 | Till ................... B41J 3/40733 |
| | | 141/2 |
| 2010/0037986 A1* | 2/2010 | Neumann ................ B67C 3/22 |
| | | 29/402.02 |
| 2011/0180179 A1* | 7/2011 | Krakers ................ B65B 57/00 |
| | | 141/85 |
| 2013/0231772 A1* | 9/2013 | Hahn ................... B29C 49/78 |
| | | 700/204 |
| 2014/0298100 A1* | 10/2014 | Grimm ................... B65C 9/40 |
| | | 714/37 |
| 2017/0015540 A1* | 1/2017 | Zoni ....................... B67C 3/26 |
| 2017/0154417 A1* | 6/2017 | Niedermeier ........ H04N 13/254 |
| 2017/0315540 A1 | 11/2017 | Nishioka |
| 2019/0302082 A1* | 10/2019 | Cunningham ....... G01N 33/146 |
| 2021/0048395 A1* | 2/2021 | Will ......................... H04N 7/18 |

FOREIGN PATENT DOCUMENTS

| | | |
|---|---|---|
| CN | 103547511 A | 1/2014 |
| CN | 103562122 A | 2/2014 |
| CN | 105229698 A | 1/2016 |
| CN | 108803517 A | 11/2018 |
| DE | 102011017448 A1 | 10/2012 |
| DE | 102011103836 A1 | 12/2012 |
| DE | 102017111066 A1 | 11/2018 |

* cited by examiner

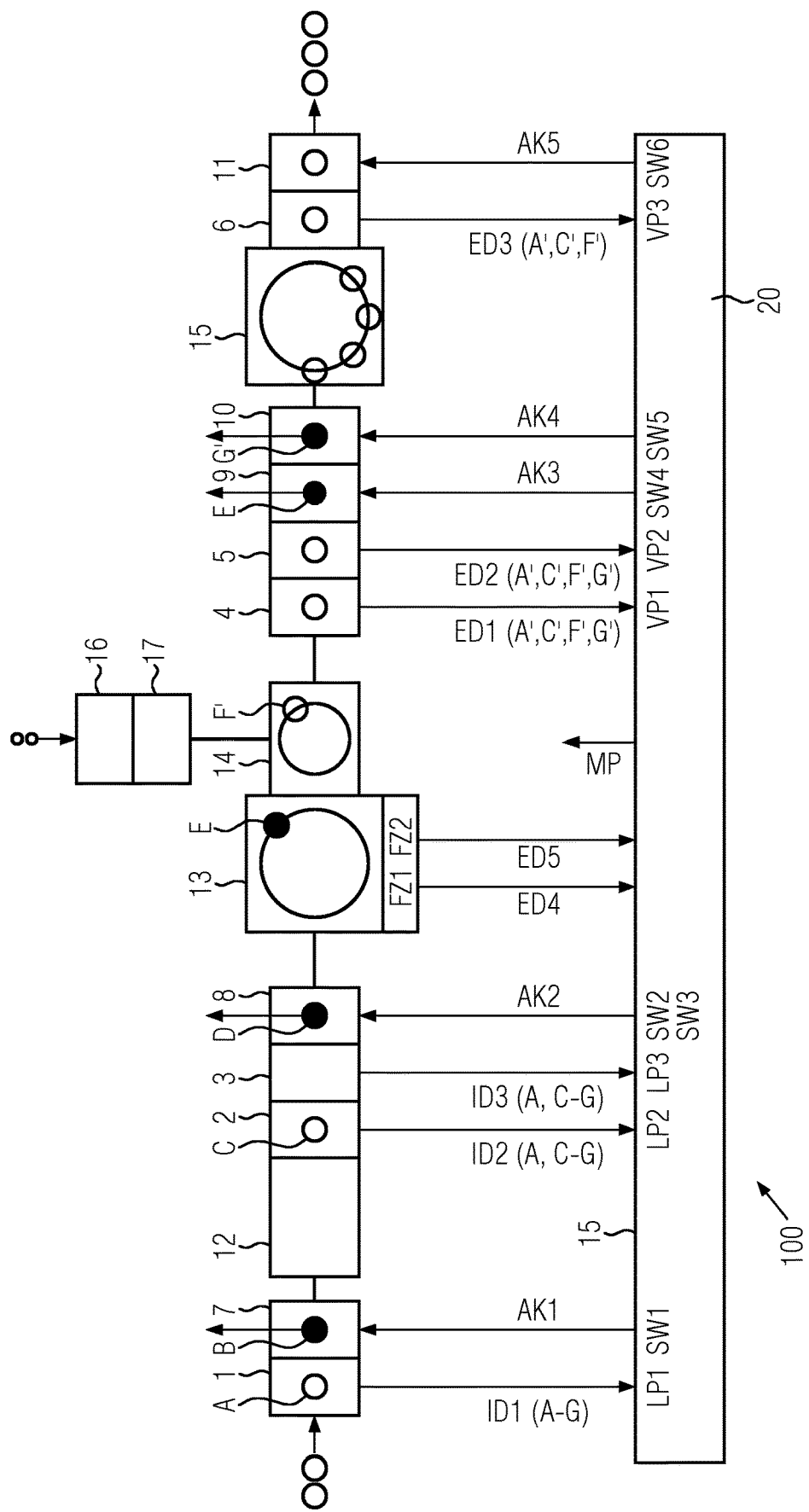

ically operating filling system, in which, on account of the updating of lead-out criteria based on production, those empty bottles that will presumably lead to unsatisfactory filling results are led out ever more reliably, while, at the same time, the scrap rate from fills that do not meet the quality requirements decreases.

METHOD FOR PRODUCT GUIDANCE IN A FILLING SYSTEM AND FILLING SYSTEM FOR GLASS BOTTLES

CROSS REFERENCE TO RELATED APPLICATIONS

The present application is a U.S. National Phase of International Application No. PCT/EP2020/053301 entitled "METHOD FOR PRODUCT CONTROL IN A FILLING INSTALLATION AND FILLING INSTALLATION FOR GLASS BOTTLES," and filed on Feb. 10, 2020. International Application No. PCT/EP2020/053301 claims priority to German Patent Application No. 10 2019 203 060.2 filed on Mar. 6, 2019. The entire contents of each of the above-listed applications are hereby incorporated by reference for all purposes.

TECHNICAL FIELD

The present disclosure relates to a method for product guidance in a filling system and to a filling system for glass bottles.

BACKGROUND AND SUMMARY

After they have been rinsed, empty returnable bottles made of glass are typically inspected with regard to cleanliness, integrity, wear and tear, and any residual content with lye or similar liquids before they are fed to a filling machine for filling a liquid product. It is known that empty bottles not in proper condition are led out upstream of the filling machine.

Despite such precautionary measures, bottles can occasionally fracture in the region of the filling machine, possibly also in upstream and/or downstream treatment stages. The interruptions in production caused thereby and the possible entry of glass splinters into leading or trailing bottles is disadvantageous. For reasons of safety, they must then be led out and are recorded as product loss.

In addition, filling levels can in principle fluctuate too much and/or leaks can arise when the product is filled and/or when the filled bottles produced in this manner are closed. They are therefore inspected downstream of the closing machine with regard to the filling level, the seating of the closure and, possibly, for leaks. However, while it is true that filled bottles identified as being faulty can then be reliably led out, not enough conclusions can to date be gathered about how the respective state of the empty bottles affects the result of the filling process, including the closure.

It has proven to be difficult and time-consuming to evaluate collected measurement data in such a way that, if possible, only those empty bottles are led out from the product flow that are highly likely to lead to a faulty filled bottle and/or cause a machine error state in the region of the filling machine and/or a downstream closing machine. For instance, it would be desirable to be able to correlate as many of the properties of the empty bottles as possible with the results data of the filled bottles and/or machine errors occurring, such as bottle fracture, in order to optimize the quality of the product filling process and the production of the filled bottles overall for the ongoing production process and to minimize downtimes and/or production gaps in the production flow.

DE 10 2011 017 448 A1 indeed discloses a method for avoiding malfunction in a filled bottle treatment system in which reference parameters and test parameters are defined for individual system components. This is intended to optimize relationships between the causes of errors and error states using computer-aided artificial intelligence, for example, with a neural network. In this context, automated or semi-automated teaching processes for the treatment system are also known in principle.

However, it would be desirable not only to avoid error states in such systems to the extent possible, but also to optimize the product quality and the machine performance as a whole.

According to the disclosure, a method may be used for product guidance in a filling system. For this purpose, empties parameters may be measured in an automated manner for filling empty glass bottles provided. Furthermore, initial data for filling a liquid product into the empty bottles may be acquired and stored. Furthermore, fulls parameters are measured when filled bottles produced from the empty bottles are filled, where machine error states that occur, such as during the filling process, are also detected in an automated manner, and respective results data acquired relating to the filling process are stored and individually associated with the empty bottles.

Furthermore, at least one lead-out criterion applicable in the downstream production is calculated for deciding whether or not to lead out faulty empty bottles or filled bottles based on a data analysis of the initial data and results data stored, where the calculation of the lead-out criterion is updated in an automated manner while taking into consideration initial data and results data acquired during the production operation.

Lead-out criteria can consequently be calculated more and more precisely with increasing production time for leading out the empty bottles or filled bottles as selectively as possible, for example, at a suitable point in the production process, in order to, firstly, acquire as much results data as possible for optimizing the production process, secondly, to avoid machine error states as reliably as possible. This also minimizes interruptions in production.

For instance, a machine learning process that progresses with the production operation is possible and which runs in an automated manner on the basis of calculation rules and can furthermore optionally be controlled by operators.

The initial data and the results data acquired can be incorporated into the production operation by way of manual and/or automated updating of the control device.

Machine parameters, for example, of a rinsing station for rinsing the empty bottle, a filling machine for producing the filled bottles from the empty bottles and a liquid product, and/or a closing machine for closing the filled bottles, can be adjusted on the basis of the initial data and the results data acquired for optimizing the product quality.

This may be used for ongoing quality assurance and/or quality improvement of manufactured/filled bottles. Above all, this allows the scrap rate of the production to be reduced.

When determining lead-out criteria, priority may be given to optimizing the quality of production over the most comprehensive possible collection of initial data and/or results data. This means that an empty bottle that is unsuitable for further processing is led out from the product flow as early as possible in the weighting case, as is necessary or can be predicted in order to achieve a certain product quality.

The lead-out criterion can be changed in an automated manner in such a way that a proportionate frequency of permissible values of the fulls parameters predicted by way of the data analysis increases and, optionally, a predicted proportionate frequency of the machine error states also decreases. This enables a continually self-improving optimization process. The product quality of the closed filled bottles can then be improved while at the same time minimizing production downtimes and/or product gaps in the product flow. The proportional frequency is to be understood to be, for example, the number of correctly manufactured and closed filled bottles per number of empty bottles examined on the assumption that the average quality of the empty bottles provided remains constant.

The data analysis may comprise data mining, such as an association analysis and/or a regression analysis, and/or a data classification of the initial data and/or the results data. Classification, regression analysis, and association analysis are suitable for evaluating newly acquired initial data and results data in the context of a prognosis about the effect of certain empties parameters on fulls parameters to be achieved.

Such analysis methods can be used in the context of machine learning processes and self-optimization of the filling system in the sense of artificial intelligence or the like. Furthermore, additional, possibly previously unknown or undervalued correlations between individual empties parameters and/or fulls parameters can be established and/or included in the data analysis.

In an embodiment, fulfilling the lead-out criterion based on the initial data of a specific empty bottle triggers one of the following steps: leading the associated empty bottle out upstream of a filling element of a filling machine provided for this purpose; passing the empty bottle through the filling element without filling it but closing it and leading the empty bottle out; or producing and leading out a closed filled bottle.

The empty bottles can then be led out further upstream, the greater the extent of an ascertained deviation of initial data from associated target values. On the one hand, machine error states can be avoided reliably, but on the other hand, certain empty bottles may also go through as many inspection steps and/or production steps as possible in order to use the initial data and results data acquired for the data analysis. Such empty bottles into which the liquid product cannot be filled properly are also used for optimization and the automated self-learning process, for example, by examining or establishing certain correlations in an automated manner between empties parameters and fulls parameters.

In certain embodiments, target ranges are defined for the empties parameters on the basis of the data analysis, where lead-out criteria are then fulfilled, for example, where the initial data of an empty bottle examined deviates from the respective target ranges, deviates to a certain extent, and/or deviates for a certain combination of empties parameters. This enables comparatively simple control and association of individual lead-out processes at certain points in the production flow, for example, by way of lead-out criteria that respectively apply there, both for the examined empty bottles and, possibly, also for filled bottles possibly produced therefrom.

In certain embodiments, the target ranges and/or the lead-out criterion are updated in an automated manner on the basis of a progressive accumulation of initial data and results data. The data analysis can thus be refined and rendered more precise as the production progresses. It is also possible to ignore or delete certain data records of initial data and results data, for example, outdated data records or those that relate to sets of parameters with empties parameters and/or results parameters that cannot be used for certain empty bottles.

Several sets of parameters can be taken into consideration in the data analysis, each of which comprises associated empties parameters and fulls parameters, Deviations of the measured empties parameters from their target ranges are there included with a suitable weighting when defining the lead-out criteria. In certain embodiments, the deviations are then weighted dynamically on the basis of the initial data and the results data acquired.

For example, empties parameters for which deviations from their associated target ranges have turned out to be less critical in the course of the data analysis progressing in the production operation can be weighted less and vice versa.

The empties parameters can indicate at least three, or at least five, of the following properties and/or states of the respective empty bottle: correct type of bottle, extent of scuffing, fouling, and/or damage to the side wall; fouling, rust deposits, and/or damage to the side mouth regions and/or to closure screw threads; fouling of and/or damage to sealing surfaces; fouling of and/or damage to base regions; and/or the presence of lye residues or other liquid within the empty bottle.

Types of bottles can be recognized, for example, by measuring them in light barriers or by imaging. Scuffing can also be assessed by imaging. Side walls can be assessed with regard to transparent and non-transparent fouling as well as fracture points by imaging using several cameras and suitable rotational positioning of the empty bottles. In this way, fouling and vertical cracks on the bottle mouth as well as damage and roughness of threads can also be detected. Damage, fouling, and overpressing on sealing surfaces in the mouth region can be recognized by imaging, as can fouling, damage, and shards in the region of the bottle base. Residual fluids can be detected by absorption of infrared radiation or high frequency irradiation.

In certain embodiments, at least some of the empties parameters are detected by imaging upstream of an inlet region to a filling machine, for example, downstream of a rinsing/purging station for rinsing the empty bottles. Comprehensively and flexibly evaluated initial data is acquired by imaging from comparatively few measurement processes with the data analysis and is also determined as far upstream of the filling machine as possible in order to be able to carry out any lead-out processes and any filled bottle inspections in a selective and timely manner that may need to be performed.

The fulls parameters may indicate at least two of the following properties and/or states of the filled bottles: a filling level of the filled product; absence, damage, or improper fit of an attached closure; and tightness of the closure.

The filling level can be measured, for example, by measuring bridges using high-frequency rays, infrared rays, gamma rays, or X-rays, as well as by imaging. The presence of closures can be verified without contact using sensors. The closure can also be imaged for correct fit, diameter, type, print, intactness, presence and the correct fit of lock rings and the like.

In certain embodiments, the machine error states comprise: bottle fracture at the associated filling element; bottle fracture downstream or upstream of the associated filling element; insufficient evacuation of the empty bottle at the filling element; and/or force/torque incorrect when applying the associated closure.

The inspected empty bottles can be tracked up to the filling machine/closing machine, for example, using a first-in-first-out register, using a code printed on or the like, and/or by imaging using individual features, such as scuffing, that has developed differently depending on the individual wear and tear.

Downstream of the filling/closing machine, tracking the filled bottles can be based on magnetic coding of metallic closures, coding by way of UV paint, bar coding, or two-dimensional coding.

The respectively used treatment elements, such as filling elements, can be associated individually with the empty bottles/filled bottles thus tracked. This can be included in the updated data analysis.

In certain embodiments, the filling system comprises a filling machine for empty bottles made of glass, an associated closing machine for filled bottles produced therefrom, and furthermore: at least one lead-out device for faulty empty bottles arranged upstream of the filling machine; at least one lead-out device for filled bottles and/or closed empty bottles arranged downstream of the closing machine; inspection units for the empty bottles and the filled bottles for collecting initial data and results data with the method according to at least one of the embodiments described above; and a control device for triggering the lead-out devices on the basis of at least one lead-out criterion calculated using the method according to at least one of the embodiments described above.

BRIEF DESCRIPTION OF THE FIGURES

An embodiment of the invention is illustrated by drawing. FIG. 1. shows a schematic top view onto a production system with associated data streams.

DETAILED DESCRIPTION

As shown in FIG. 1, the method according to the invention for product guidance/production control can be carried out in a filling system 100 for glass bottles. Filling system 100 accordingly comprises inspection units 1-3 for empty bottles, inspection units 4-6 for filled bottles, lead-out devices 7-9 for empty bottles, and lead-out devices 10, 11 for filled bottles, each illustrated by way of example. Filling system 100 described can also include a purging/rinsing station 12 for rinsing the empty bottles intended for filling Present in any case is a filling machine 13 of, for example, a rotary design with a plurality of filling elements (not shown) for filling a liquid product, such as a beverage, into the empty bottles and a closing machine 14 for closing the filled bottles with closing caps, for example, crown caps or screw caps. Furthermore, a labeling machine 15 for labeling properly filled and closed filled bottles can be part of filling system 100.

Closing machine 14 can be preceded by an inspection unit 16 for closing caps and a lead-out device 17 for closing caps identified as being faulty.

Filling system 100 further comprises a control device 20 which controls lead-out devices 7-11 on the basis of the lead-out criteria described below.

The production control device is indicated schematically by way of example by way of seven empty bottles A G supplied/provided and/or filled bottles A', C', F' and G' produced therefrom. Black circle fillings indicate negative inspection results.

Accordingly, due to negative inspection results in at least one of inspection units 1-3 arranged upstream of filling machine 13 and on the inlet side thereof, two empty bottles B, D are led out at first and/or second lead-out device 7, 8 upstream of filling machine 13.

Empty bottle E, on the other hand, is initially passed empty through filling machine 13 despite at least one negative inspection result in inspection units 1-3 on the inlet side and only after it has been closed is led out at third lead-out device 9 arranged downstream of closing machine 14 and on the outlet side thereof onto a lead-out lane into a collection container (each not shown) or the like.

Four empty bottles A, C, F and G (not all of which are designated separately in FIG. 1) pass first, second, and third inspection units 1-3 with correct inspection results and are consequently filled with product and closed; this corresponds to the regular production/manufacture of filled bottles A', C', F' and G'.

In first inspection unit 1 on the inlet side upstream of purging/rinsing station 12, a first empties parameter LP1 is measured/verified, for example, the presence and/or extent of scuffing caused by wear on empty bottles A-G.

Downstream of rinsing station 12, a second and third empties parameter LP2, LP3 are measured in second and third inspection unit 2, 3 on the inlet side, for example, the presence of residual lye or other liquid in (remaining) empty bottles A and C-G and the extent of any possibly given sidewall fouling of empty bottles A and C-G.

The type and number of inspection units on the inlet side can differ from the example described and, for example, be modularly adapted to the empty bottles to be processed and/or to control certain treatments carried out upstream.

First inspection unit 1 delivers at least one measured value of first empty container parameter LP1 in the form of first initial data ID1 for each empty bottle AG measured there. Second and third inspection units 2, 3 correspondingly deliver measured values of second and third empty container parameters LP2, LP3 in the form of second and third initial data ID2, ID3 for each empty bottle A, C-G measured there. They are each transmitted to control device 20. First initial data ID1 is associated with all empty bottles A-G, second and third initial data ID2, ID3 with remaining empty bottles A and C-G.

In fourth and fifth inspection units 4, 5 disposed downstream of filling machine 13 and on the outlet side thereof, closed filled bottles A', C', F', G' (not all of which are illustrated as a circle) are examined with regard to fulls parameters VP1, VP2 created during the filling process, for example, a filling level of the product in filled bottles A', C', F', G' and the correctness of their closure.

Fourth inspection unit 4 delivers at least one measured value of first fulls parameter VP1 in the form of first results data ED1 for each filled bottle measured there, fifth inspection unit 5 correspondingly delivers at least one measured value of second fulls parameter VP2 in the form of second results data ED2. They are each transmitted to control device 20.

First and second results data ED1, ED2 are associated as filled bottles A', C', F', G' with filled empty bottles A, C, F, G and therefore with their initial data ID1-ID2.

Empty bottle E could optionally be processed incompletely when/after being passed through filling machine 13, for example, only by closing it, and be inspected in fourth and/or fifth inspection unit 4, 5 with regard to at least one of fulls parameters VP1, VP2 or with regard to one parameter only relevant for the closing or another treatment step performed. In this way, for example, results data ED2 for empty bottle E can be acquired as in a corresponding filled bottle inspection. This results data ED2 can then also be stored in control device 20 and associated with empty bottle E and its stored initial data ID1-ID3.

In sixth inspection unit 6 on the outlet side of labeling machine 15, labeled filled bottles A', C', F' are measured with regard to at least one fulls parameter VP3 that is relevant after labeling, for example, for the correct label placement or the like Results data ED3 acquired there can then likewise be stored in control device 20 and associated with underlying empty bottle A, C, F as well as its stored initial data ID1-ID3.

It is also schematically indicated that, for example, filling machine 13 and/or closing machine 14 and/or the purging/rinsing station 12 and/or labeling machine 15 can be monitored with regard to the occurrence of machine error states FZ1, FZ2, for example, with regard to the occurrence of a bottle facture in the inlet and/or outlet of filling machine 13 and/or a leak detected in the region of filling machine 13 or closing machine 14 and/or incorrect closing forces/torques.

In a broader sense, a machine error state can be a failure to recognize or reject fouled or otherwise contaminated containers. For example, a shard in a bottle that was not recognized during the empty bottle inspection (for example in one of inspection units 1-3) can still be recognized during a subsequent filled bottle inspection (for example in one of inspection units 4 and 5).

In the presence of a machine error state FZ1, FZ2, associated fourth or fifth results data ED4, ED5 are stored in control device 20 and associated with the respective empty bottle concerned and its initial data ID1-ID3 stored.

Initial data, results data, and/or error states may be detected by imaging and/or in a sensor-based manner.

During the production operation, control device 20 carries out a data analysis at predetermined intervals on the basis of initial data ID1-ID3 collected for a plurality of empty bottles and results data ED1-ED5 available for this. The data analysis comprises, for example, data mining with classification and/or regression analysis and/or association analysis and can be based on self-learning algorithms in the sense of artificial intelligence.

Based on the data analysis, lead-out criteria AK1-AK5 are calculated in an automated manner and determine which initial data ID1-ID3 or which results data ED1-ED5 cause empty bottles/filled bottles to be led out at one of lead-out devices 7-11.

A first lead-out criterion AK1 is used, for example, to decide whether an empty bottle recognized as being faulty in first inspection unit 1 is to be separated from the product flow by first lead-out device 7. In the example shown, this is the case for empty bottle B, as is shown schematically by a lead-out arrow. Empty bottle B fulfills first lead-out criterion AK1, for example, if initial data ID1 measured for empty bottle B deviates in an impermissible manner from a target value SW1 of associated empties parameter LP1 calculated in control device 20 on the basis of the data analysis.

After empty bottle B has been led out at first lead-out device 7, triggered by first lead-out criterion AK1, no further initial data ID2, ID3 or results data ED1-ED5 can be collected for this empty bottle B.

In order to optimize the production process as comprehensively as possible, however, it is desirable to possibly acquire additional initial data ID2, ID3 and/or results data ED1-ED5 for cosmetically faulty empty bottles in order to establish or to specify and/or weigh correlations between initial data ID2, ID3 and/or results data ED1-ED5. The data analysis, and with it lead-out criteria AK1-AK5, can then be dynamically optimized on this basis.

To avoid the spread of germs, however, it must be ensured that no contaminated empty bottles reach filling machine 13. Damage to filling system 100, production interruptions, and product losses are also to be avoided as comprehensively as possible. As a result, lead-out criteria AK1-AK5 are continuously optimized in order to meet the requirements for a meaningful data analysis as well as the requirements for an economical and smooth production process and the desired product quality.

Under this premise, as many empty bottles as possible are not led out at first lead-out device 7, but, as in the case of empty bottles A and C-G, are fed to purging/rinsing station 12 and cleaned/rinsed there for subsequent filling. Empty bottles A and C-G are thereafter inspected in second and third inspection units 2, 3 and their initial data ID2 and ID3 thus acquired is transmitted to control device 20.

It is verified for each of empty bottles A, C-G inspected in this manner whether a second lead-out criterion AK2 previously calculated in control device 20 on the basis of the data analysis is fulfilled. It is fulfilled, for example, if at least second initial data ID2 or third initial data ID3 of a specific empty bottle A, C-G deviates in an impermissible manner from a target value SW2, SW3 of respective associated empties parameters LP2, LP3. In the example shown, this is the case with empty bottle D. It is therefore separated from the product flow by second lead-out device 8.

Each lead-out criterion AK1-AK5 can be calculated almost at random on the basis of previously collected initial data ID1-ID3 and individually associated results data ED1-ED5. For example, if it is found that a certain constellation of initial data ID1-ID3 correlates with results data ED1-ED5 that is negative for product quality and/or harmful to the production process.

First and/or second lead-out criterion AK1, AK2 would prevent a certain empty bottle from being forwarded to rinsing station 12, filling machine 13, and closing machine 14, and/or labeling machine 15 in the event of such a negative prognosis in that the empty bottle concerned is led out at first or second lead-out device 7, 8. Correspondingly, lead-out criteria AK1-AK5 can also be relaxed if this is concluded from an updated data analysis.

Initial data ID1-ID3 of empty bottles A and C-G do not fulfill second lead-out criterion AK2, so that they are fed to filling machine 13. It is schematically indicated in the region of filling machine 13 that, an empty bottle E that was not previously led out does not fulfill second lead-out criterion AK2 due to its initial data ID1-ID3, but does fulfill a third lead-out criterion AK3, whereby empty bottle E is separated from the product stream downstream of filling machine 13 and closing machine 14 at third lead-out device 9. Empty bottle E can therefore either be led out upstream of filling machine 13 or channeled empty through filling machine 13, closed in closing machine 14, and separated after inspection of the closure produced. Other inspections would also be conceivable at fourth and/or fifth inspection unit 4, 5. In this way, first and/or second results data ED1, ED2 for possibly closed empty bottle E usable within the framework of the data analysis could be acquired. Empty bottle E, which has not been treated or treated in part, could also be fed to labeling machine 15 and downstream inspection unit 6 in order to acquire further results data ED3.

All empty bottles whose initial data ID1 ID3 fulfill neither first nor the second lead-out criteria AK1, AK2, presently empty bottles A, C, F and G, are processed in filling machine 13 to become filled bottles, closed in closing machine 14, and inspected in fourth and fifth Inspection unit 4, 5. First and second results data ED1, ED2 acquired in this manner is associated with underlying empty bottles A, C, F and G and can be correlated in the data analysis both with one another as well as with associated initial data ID1-ID3 of empty bottles A, C, F and G.

If a fourth lead-out criterion AK4 is fulfilled for the filled bottles examined in this manner, for example, for the reason that first results data ID1 and/or second results data ED2 deviate in an impermissible manner from a fourth or fifth target value SW4, SW5 of respectively associated fulls parameter VP1, VP2, then the respective filled bottles, in the example filled bottle G', are separated from the product flow at fourth lead-out device 10.

Correctly filled and closed filled bottles A', C', and F' are fed to labeling machine 15 and provided there with a label and/or are printed on directly. Filled bottles A', C', F' that have been labeled/printed on are subsequently examined, for example, in a fifth inspection unit 6. Third results data ED3 acquired in the process are also transmitted to control device 20.

For the sake of completeness, a fifth lead-out device 11 arranged downstream of labeling machine 15 is also indicated schematically. It leads out incorrectly labeled/printed filled bottles (or possibly also partially treated empty bottles) for which a fifth lead-out criterion AK5 is fulfilled, for example, based on a comparison of third results data ED3 with a sixth target value SW6 of associated third fulls parameter VP3.

Continuously monitored machine error states FZ1, FZ2 are optionally also transmitted to control device 20 with an association with the concerned or underlying empty bottle in order to take them into consideration in the data analysis in terms of fourth and fifth results data ED4, ED5. All results data ED1-ED5 can thus be correlated with one another with individual or groups of initial data ID1-ID3 individually for single empty bottles and/or for groups of empty bottles.

During ongoing production, initial data ID1-ID3 and results data ED1-ED5, to the extent available for the individual empty bottles and filled bottles, are associated with one another and accumulated. With the data analysis, for example, in the sense of data mining, correlations between individual empties parameters LP1-LP3, fulls parameters VP1-VP3, and/or machine error states FZ1, FZ2 can be calculated and continuously updated and, possibly rendered more precise by acquiring initial data and results data during the production operation.

On this basis, individual lead-out criteria AK1-AK5 that subsequently apply in the production operation can be continuously recalculated in order to lead out individual empty bottles in a selective manner in such a way that production interruptions and/or damage can be prevented and as much information as possible about correlations between initial data and results data can be established at the same time.

Individual empties parameters LP1-LP3 or initial data ID1-ID3 associated therewith can be processed in a weighted manner depending on the effect on results data ED1-ED5. Such a weighting of parameters and/or sets of parameters can also be continuously adapted during ongoing production operations in the sense of self-optimization of filling system 100 in order to produce as many high-quality filled bottles as possible from the empty bottles and/or to improve the informative value of the data analysis.

In certain embodiments, any suitable algorithms can be used in control device 20 for processing initial data ID1-ID3 and results data ED1-ED5, e.g., to enable machine-internal optimization and/or machine-internal learning in the sense of artificial intelligence.

It is crucial that lead-out criteria AK1-AK5 can be dynamically adapted in dependence of the accumulating and/or updated data volume with mutually associated initial data of the empty bottle and results data of the filled bottles produced therefrom.

The above-described data analysis and control process can also include inspection unit 16 for closure caps that is upstream of closing machine 14 and lead-out device 17 for closure caps that have been identified as being faulty. For example, inspection unit 16 can supply at least one measured value of a further empties parameter in the form of further initial data for each closure cap measured there. Likewise, a separate lead-out criterion can be calculated for lead-out device 17 and used in principle in the same manner for closure caps as was described above for lead-out devices 7-11.

Separately illustrated lead-out devices, such as, for example, lead-out devices 9, 10 downstream of sealing machine 14, can also be combined with one another. This means that different lead-out criteria can be calculated for a specific lead-out device. For example, third lead-out criterion AK3 could be used to separate empty bottles treated in part onto a specific lead-out lane, the fourth reject criterion to separate faulty filled bottles onto another lead-out lane, e.g., in a single or in several lead-out devices.

Machine parameters MP, for example, of purging/rinsing station 12, of filling machine 13, of closing machine 14, and/or of labeling machine 15 can be continuously adapted on the basis of acquired initial data ID1-ID3 and results data ED1-ED5 to optimize the product quality.

Initial data ID1-ID3 and results data ED1-ED5 acquired can flow into the production operation both through manually triggered and also through automated updating of lead-out criteria AK1-AK5 and/or machine parameters MP.

Embodiments of the disclosure may simultaneously enable the minimization of machine error states and quality optimization when filling filled bottles during ongoing operations.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for product guidance of glass bottles in a product flow through a filling system, where empties parameters for filling empty glass bottles provided are measured in an automated manner and initial data for filling a liquid product into said empty glass bottles is acquired and stored, where fulls parameters are measured when filled bottles, produced are filled, machine error states that occur during the filling process are detected in an automated manner, and respectively acquired results data of the filling process are individually associated with said empty glass bottles and stored, where at least one lead-out criterion applicable in a downstream production operation is calculated for deciding whether or not to lead out faulty empty bottles or filled bottles based on a data analysis of said initial data and results data stored, where a calculation of said at least one lead-out criterion is updated taking into consideration initial data and results data acquired during production, and where fulfilling said lead-out criterion triggers: leading said associated empty bottles out by separating the same from the product flow upstream of a filling element provided for this purpose; or passing said associated empty bottles through said filling element without filling them, but closing them and leading said empty bottles out by separating the same from the product flow; or producing closed filled bottles from the associated empty bottles and leading out the closed filled bottles by separating the same from the product flow.

2. The method according to claim 1, where said initial data and said results data acquired are incorporated into the production operation updated in a manual and/or automated manner.

3. The method according to claim 1, where machine parameters, of a filling machine for producing said filled bottles, and/or a closing machine for closing said filled bottles are adapted to optimize a product quality obtained.

4. The method according to claim 1, where said at least one lead-out criterion is optimized in an automated manner in such a way that a proportionate frequency of permissible values of said fulls parameters predicted by way of said data analysis increases.

5. The method according to claim 1, where said data analysis comprises data mining.

6. The method according to claim 1, where respective target ranges of said empties parameters are defined based on said data analysis, and where said at least one lead-out criterion specifies which and/or to which extent initial data of an empty bottle examined may deviate from said respective target ranges.

7. The method according to claim 6, where said respective target ranges and/or said at least one lead-out criterion is/are updated based on a progressive accumulation of initial data and results data acquired.

8. The method according to claim 6, where several sets of parameters are taken into consideration in the data analysis, each of which comprises associated empties parameters and fulls parameters, and where deviations of measured empties parameters from their target ranges are included in a weighted manner.

9. The method according to claim 1, where said empties parameters indicate at least three of the following properties and/or states of said respective empty bottles: correct type of bottle, extent of scuffing, fouling of and/or damage to a side wall; fouling of, rust deposits, and/or damage to side mouth regions/closure threads; fouling of and/or damage to sealing surfaces; fouling of and/or damage to base regions; and/or a presence of lye residues or other liquid in the interior.

10. The method according to claim 3, where at least some of said empties parameters are detected by imaging upstream of and/or in said inlet region of a filling machine.

11. The method according to claim 9, where said fulls parameters indicate at least two of the following properties/states of said filled bottles: a filling level of said filled product; absence, damage to, or improper fit of an attached closure; tightness of the closure.

12. The method according to claim 3, where said machine error states comprise: bottle fracture at an associated filling element; bottle fracture downstream of said associated filling element; insufficient evacuation of said empty glass bottle at said filling element; and/or force/torque incorrect when applying an associated closure.

13. A filling system for glass bottles guided in a product flow through the filling system, with a filling machine for empty glass bottles and an associated closing machine for filled bottles produced therefrom and further comprising: at least one lead-out device arranged upstream of said filling machine for separating empty glass bottles from the product flow; at least one lead-out device arranged downstream of said closing machine for separating filled bottles and/or closed empty bottles from the product flow; inspection units for said empty bottles and said filled bottles for collecting initial data and results data using the method according to claim 1; and a control device for triggering said at least one lead-out device on the basis of at least one lead-out criterion calculated using the method according to claim 1.

14. The method in accordance with claim 3, wherein the machine is an upstream rinsing station for rinsing said empty glass bottles.

15. The method in accordance with claim 4, where the predicted proportionate frequency of machine error states decreases.

16. The method in accordance with claim 5, wherein the data analysis is an association analysis, and/or a regression analysis, and/or a data classification.

17. The method in accordance with claim 8, wherein the fulls parameters and empties parameters are weighted dynamically on the basis of initial data and results data acquired, in defining said at least one lead-out criterion.

18. The method in accordance with claim 9, where said empties parameters indicate at least five of the properties and/or states of said respective empty bottles.

19. The method in accordance with claim 10, where said at least some of said empties parameters are detected by imaging upstream of and/or in said inlet region of a filling machine upstream, downstream of a rinsing station for rinsing said empty bottle.

* * * * *